United States Patent
Frantz

Patent Number: 6,167,043
Date of Patent: Dec. 26, 2000

[54] METHOD AND SYSTEM FOR SMALL OFFICE AND HOME OFFICE TELEPHONE PRIVATE BRANCH EXCHANGE ALLOWING SIMULTANEOUS DATA AND VOICE COMMUNICATIONS

[75] Inventor: Robert Heflin Frantz, Plano, Tex.

[73] Assignee: Intelect Communications, Inc., Richardson, Tex.

[21] Appl. No.: 09/024,706

[22] Filed: Feb. 17, 1998

[51] Int. Cl.[7] .................... H04L 12/66; H04M 11/06
[52] U.S. Cl. .................... 370/356; 370/352; 370/401; 379/93.1; 379/93.4
[58] Field of Search .................... 370/352, 353, 370/354, 355, 356, 401; 379/93.1, 93.2, 93.3, 93.4, 93.5, 93.6, 93.7; 709/202, 249

[56] References Cited

U.S. PATENT DOCUMENTS

| | | | |
|---|---|---|---|
| 5,724,355 | 3/1998 | Bruno et al. | 370/401 |
| 5,742,596 | 4/1998 | Baratz et al. | 370/356 |
| 5,805,587 | 9/1998 | Norris et al. | 370/352 |
| 5,809,128 | 9/1998 | McMullin | 379/215 |
| 5,852,655 | 12/1998 | McHale et al. | 379/93.14 |
| 5,889,774 | 3/1999 | Mirashrafi et al. | 370/352 |
| 5,940,479 | 8/1999 | Guy et al. | 379/93.01 |
| 5,946,381 | 8/1999 | Danne et al. | 379/142 |
| 5,982,774 | 11/1999 | Foladare et al. | 370/401 |

*Primary Examiner*—Hassan Kizou
*Assistant Examiner*—Saba Tsegaye
*Attorney, Agent, or Firm*—Robert H. Frantz

[57] ABSTRACT

By coupling the functionality of an Internet Telephony function in a personal computer, an Internet Voice Gateway, and a small-office/home-office (SOHO) private branch exchange (PBX), and through inventive coordination of the functions of these units, a SOHO telecommunications system and method are realized which allow use of PBX extension telephones while all PBX outbound telephone lines are occupied by Internet data communications sessions.

18 Claims, 2 Drawing Sheets

METHOD AND SYSTEM FOR SMALL OFFICE AND HOME OFFICE TELEPHONE PRIVATE BRANCH EXCHANGE ALLOWING SIMULTANEOUS DATA AND VOICE COMMUNICATIONS

TECHNICAL FIELD OF THE INVENTION

This invention relates to Internet communications arrangements and traditional telephone communications arrangements. More particularly, this invention relates to a system and method for allowing voice and data telecommunications simultaneously on a single telephone line such that the external telephone line of a Private Branch Exchange may be utilized for data communications to an Internet Service Provider, while extension telephones may communicate with other extension telephones or other telephones connected to the external Public Switched Telephone Network.

BACKGROUND OF THE INVENTION

Millions of residential and office Internet accounts are accessed by using a computer with a modem and a "dial up" telephone connection to an Internet Service Provider (ISP). In many of these cases, especially the Small Office/Home Office (SOHO) cases, the telephone line used for this access is the only telephone line to the residence or office. Consequently, for the duration of the ISP connection "web browsing", the telephone line is occupied and no telephone calls can be made or received at the residence or small office telephone sets.

Therefore, there exists a need in the art for a system and method to enable occupants of a small office or home office equipped with a single telephone line to make and receive telephone calls from the telephone sets while the external telephone line is used for Internet browsing.

Furthermore, there exists a need in the art for this system and method which allows simultaneous voice and data communcications using a variety of data communication technologies, including voice-band modems, analog or digital telephone lines, local area networks (LAN), and digital subscriber loops (xDSL).

Finally, there is a need in the art for this system and method to be easily installable by persons untrained in telecommunications gear and technology to allow this invention to be marketed through conventional retail channels.

SUMMARY OF THE INVENTION

The object of the present invention is to allow a telephone line to be used simultaneously for voice and data communications in arrangements typical to residential and small office environments.

Another object of the invention is to allow the normal analog telephones found in most residences and small offices to be used to make telephone calls without special knowledge of the user while data communications on the telephone line occurs.

Finally, another object of the invention is to embody the system and method such that persons unskilled in telecommunications equipment installation can easily implement and use the system.

The system and method requires three components in the preferred embodiment to realize the advantages of the invention. The first component is a circuit card coupled with software and a personal computer. The circuit card may be designed internal to the personal computer, such as an industry standard architecture (ISA) or peripheral component interface (PCI) card, or it may be implemented as an external device similar to an external modem. The second component is a small adapter unit, which installs between the traditional analog telephones found throughout the residence and their normal telephone jacks. Using a modulation scheme which carries the voice signal from the telephones to the house telephone wires which is above the voice-band utilized by the modem performing data communications, the adapter unit and the PC circuit can exchange voice signals. To complete the voice communications path, the PC circuit card performs an Internet voice encoding and decoding function, and communicates to the third component of the inventive system, an Internet voice gateway. The Internet voice gateway sends and receives Internet audio to and from the PC circuit, and communicates that to traditional telephone lines.

During call setup, the Internet voice gateway reproduces the dual-tone multifrequency (DTMF) dialing signals onto the traditional telephone lines to accomplish dialing to the intended party. During reception of a new call at the residence, the Internet voice gateway sends a special control message to the PC circuit. The PC circuit in turn sends a special control message to the adapter units, which then generate an analog ring signal to the traditional telephones causing them to "ring".

During the "call established" state of any call, voice communications between the telephones and the PSTN are enabled by normal Internet telephony vocoding.

BRIEF DESCRIPTION OF THE DRAWINGS

For a more complete understanding of the invention.

FIG. 1 shows a modem 9 and personal computer 13 (PC) which are connected to the PSTN 6 via a single household telephone line 8. On FIG. 1, the telephone wires extend to the house or office to the PSTN are denoted by reference number 8, and the internal premise wiring is denoted by reference number 8', although they are electrically the same node. The modem 9 may be installed in the personal computer 13, such as an ISA internal modem, or may be physically discrete from the PC 13. In the former case, the interconnect 11 may be an ISA bus, or preferably a PCI bus. In the latter case, the interconnect 11 may be a RS-232 serial port or preferably a Universal Serial Bus (USB). The arrangement of the modem 9, personal computer 13, interconnect 11, and telephone line 8 and 8' is well known in the art and is common to Internet browser equipment. The household telephone line 8 is preferably a plain old telephone service (POTS) analog line.

Figure 1:
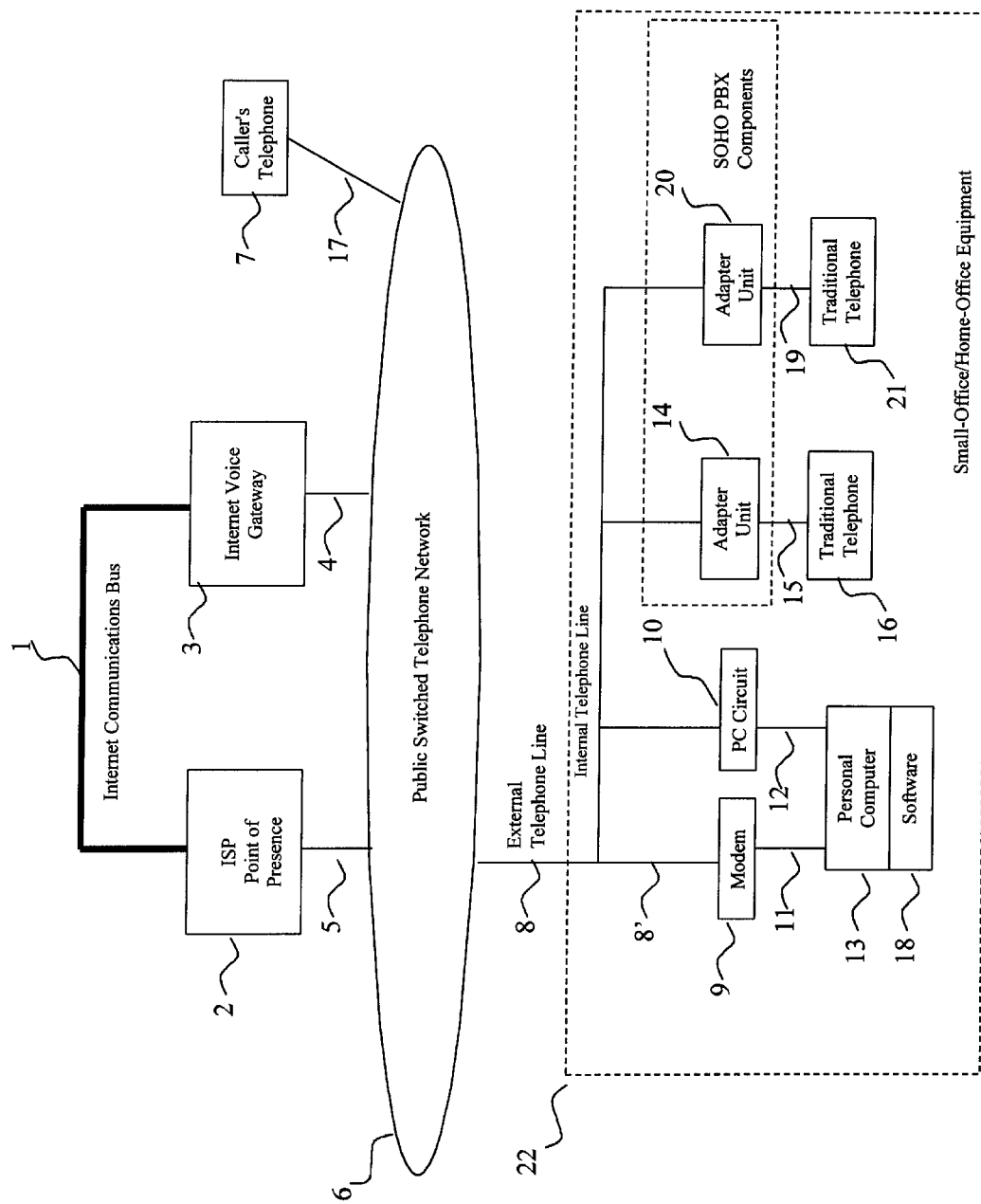
FIG. 1 shows the system formed by the invention. The Internet backbone 1 is accessed by the Internet Voice Gateway 3 and the Internet Service Provider point of presence (ISP POP) 2, enabling communications of Internet audio and data between the gateway 3 and the ISP POP 2. Both, the ISP POP 2 and the gateway 3 can make and receive telephone calls on the public switched telephone network 6 (PSTN) via local telephone lines 5 and 4. Also connected to the PSTN 6 is a normal telephone 7 via another standard telephone line 17. The ISP POP 2, Internet Voice Gateway 3, PSTN 6, telephone 7, and their method of interconnection are well known in the art. The Internet Voice Gateway 3 may be one of the several available voice-over-Internet gateways from manufacturers such as Lucent Technologies or Inter-Tel. The ISP POP 2 is a traditional arrangement of modems, switches, and routers commonly employed at hundreds of Internet Service Providers.

Also shown in FIG. 1 is are two traditional home telephones 16 and 21, which are normally connected directly to the premise internal telephone line 8. SOHO PBX adapter units 14 and 20 are installed between the telephones 16 and 21 to allow communication between the telephones without interfering with or occupying the telephone line. These adapter units are preferably part of any of the line-sharing SOHO PBX systems currently available which allow a single premise internal telephone line 8 to be used for multiple telephone extensions without occupying the actual line 8 to the PSTN. Such a readily-available SOHO PBX is the Lucent Technologies Partner Smart Solutions PBX. The Lucent Partner Smart Solutions PBX uses frequency-modulated (FM) carrier channels across the premise internal telephone lines 8' to carry telephone voice traffic between extension telephones 16 and 21. The carrier channels are of a high enough frequency and low power so as not to interfere with the voice-band signals and DC control signals of the analog telephone line 8', leaving external telephone line 8 free for normal use. The SOHO PBX Adapter Units 14 and 20 perform FM modulation and demodulation functions for each telephone to unique FM channels. Also, the SOHO PBX Adapter Units 14 and 20 emulate PSTN functions such as ring signal generation and dial tone generation to allow telephones 16 and 21 to function seemingly normally.

The PC software 18 performs the Internet Audio functions to receive and make telephone calls over the Internet using the microphone and speaker of the multimedia PC 13 while Internet browsing simultaneously occurs. This can be one of several common software packages such as Ericsson's PhoneDoubler product.

Figure 2:
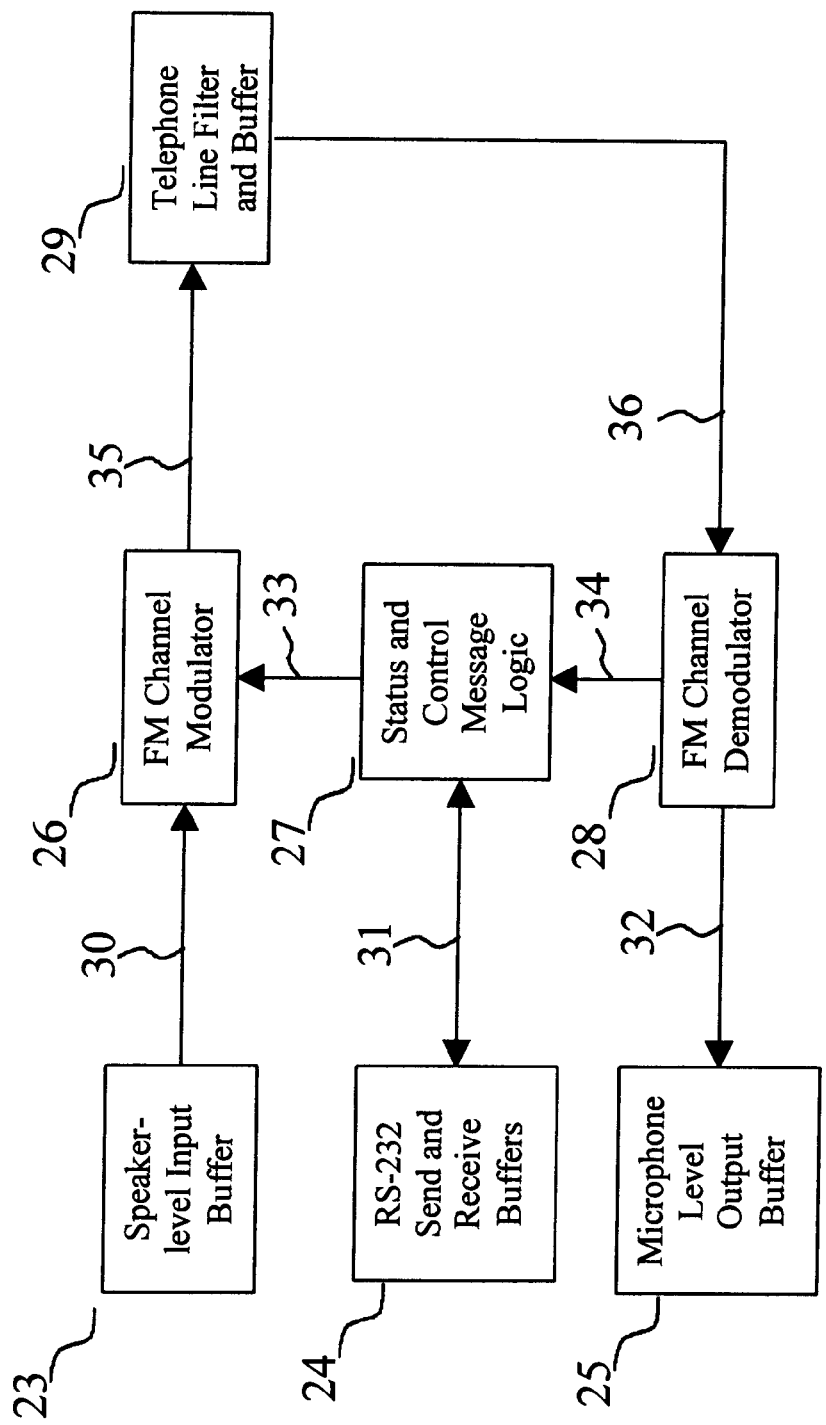

To realize the invention, first the PC circuit 10 is interconnected between the premises internal telephone line 8' and the PC's audio I/O and serial port. Preferably, the PC circuit 10 may be physically discrete from the PC 13, and the interconnect 12 consists of two audio connections and an RS-232 link for control and status. One of the audio connections is for transmitting audio signals from the PC circuit 10 to the PC 13, and the other audio connection is for transmitting audio signals from the PC 13 to the PC circuit 10. These preferably are the PC's microphone (MIC) and speaker (SPKR) connections, but may be line-in and line-out connections if desired. The PC 13 may have these audio connections as part of its standard equipment, or this may be added functionality by the installation of a common sound board such as a Creative Labs Soundblaster card. FIG. 2 shows a detail block diagram of a PC circuit 10 implemented with microphone and speaker I/O. Alternatively, the PC circuit interconnect 12 is a PCI bus, and the functionality of PC circuit 10 is physically incorporated into the PC 13.

Second, the PC software 18 is amended to perform control functions necessary to coordinate the activities of the SOHO PBX and the Internet Audio software. Equipment group 22 indicates equipment which is installed at the small or home office premise.

FIG. 2 shows a detail of the operation of the PC circuit 10 of FIG. 1. A speaker level input buffer 23 receives the audio output from the personal computer, speaker output buffers it and translates it to a transmit baseband signal 30 to the FM channel modulator 26. The FM channel modulator 26 modulates the audio from the PC to an assigned FM channel frequency. The transmit modulated audio 35 is communicated electrically to the telephone line filter and buffer 29, which couples the transmit modulated audio onto the household or small office premise internal telephone wires 8. The telephone line filter and buffer 29 removes battery voltage and voice-band signals from the signal present on the premise internal telephone wires 8, subtracts the transmit modulated audio signal 35 from the resulting filtered telephone line signal, and communicates the receive modulated audio 36 to the FM channel demodulator 28. The FM channel demodulator 28 converts the signal back to a received baseband audio signal 32 which is then translated and buffered by the Microphone Level Output Buffer 25. The output of the Microphone Level Output Buffer 25 is electrically coupled to the microphone input of a multimedia PC.

FIG. 2 also shows Status and Control Message Logic 27 which sends and receives messages to the SOHO PBX extensions via the FM Channel Modulator 26 and FM Channel Demodulator 28, via paths 33 and 34 respectively. Received control messages 34 are sent to the PC's RS-232 interface 24 by the Status and Control Message Logic 27 via path 31, these messages being ultimately delivered to a PC which is connected to the RS-232 interface 24. Messages from a PC connected to RS-232 interface 24 are sent to the Status and Control Message Logic 27, and ultimately delivered to the SOHO PBX extension telephones 16 and 21 via path 33, FM Channel Modulator 26 and to the premise internal telephone line through path 35 and the Telephone Line Filter and Buffer 29.

DETAILED DESCRIPTION OF THE INVENTION

As a precursor to setting forth the invention in detail, it may be of interest to understand the usual method of interworking between an Internet PC and the Internet. As shown in FIG. 1, the PC 13 with modem 9 can "dial up" the ISP POP 2 via the PSTN 6 to establish a telephony connection between the PC 13 and the Internet 1. This occupies the Internet user's telephone line (8 and 8') so that the telephone in his house 16 is rendered incapable of receiving or making a telephone call to the PSTN 6. Other telephone subscriber's telephones such as telephone 7 are also incapable of contacting the user's telephone 16 for the duration of the Internet connection to ISP POP 2. During the connection to the ISP POP 2, the user of the PC 13 can contact any Internet server using a standard data communications protocol such as Transmission Control Protocol/Internet Protocol (TCP/IP). The lowest level of communication protocol between the PC 13, modem 9, and ISP POP 2 may be a standard protocol such as Point-to-Point Protocol (PPP). TCP/IP and PPP are well known in the art.

The data communication modulation scheme of modem 9 may be a standard such as International Telecommunications Union Recommendation V.34 (ITU V.34). Such modulation schemes only use signals in the 100 Hz to 4 kHz bandwidth, which is known as the voice-band.

The SOHO PBX 14 and 20 receive microphone audio signals in the 100 to 4000 Hz range from the extension telephones 16 and 21 via emulated POTS connections 15 and 19. However, this signal is not passed on to premise internal telephone line 8', but is modulated to a carrier channel above 4 kHz such as 3 MHz. The modulation scheme is preferably Frequency Modulation (FM) for best audio fidelity, but several alternate modulation schemes are well known in the art. The FM scheme is one method of implementing a single-pair SOHO PBX, and it is the method described as used by the Lucent Partner Smart Solutions SOHO PBX.

While the external telephone line 8 is engaged by the PC 13 and modem 9 during Internet browsing, normally no telephone calls could be originated from or received at the telephones 16 and 21. Anyone attempting to call the residence or small office from telephone 7 would receive a busy signal from the PSTN. If an Internet telephone software package 18 is installed on PC 13 such as the Ericsson PhoneDoubler, the caller from telephone 7 would be able to make voice contact with the user of the PC13, but still could not reach anyone at the SOHO PBX extension telephones 16 and 21. Additionally, even with the PhoneDoubler product installed in the PC, no outbound telephone calls can be initiated from the SOHO PBX extension telephones 16 and 21.

The invention operates as follows to allow the extension telephones to be used for inbound and outbound voice telephone traffic while the residence or small office external telephone line 8 is in use for Internet browsing.

First, a special adapter PC circuit 10 is added to the SOHO equipment group 22 on the premises of the home or office. Furthermore, special coordination control software is added to the PC software 18 in the PC 13 to coordinate the operations of the PhoneDoubler and the SOHO PBX.

The PC circuit 10 uses a modulation and demodulation scheme compatible with the SOHO PBX adapter units, preferably in this case the same channelized FM scheme of the Lucent SOHO PBX. The PC circuit 10 operates as another extension telephone adapter unit of the SOHO PBX, being capable of initiating and receiving voice telephone traffic to and from the extension telephones 16 and 21 via the other SOHO PBX adapter units. The PC circuit 10 interfaces preferably to the PC 13 via the PC's microphone (MIC) and speaker (SPKR) ports commonly found on multimedia PC's. Because the Ericsson PhoneDoubler and other Internet telephony products use the PC's microphone and speakers as the audio I/O devices, using these connections allows the PC circuit 10 to provide an audio interface between the Internet telephony channel and the SOHO PBX extension telephones. For status and control, the PC circuit 10 preferably includes an RS-232 connection whereby the amended software 18 can command the PC circuit 10 to initiate a call to an extension or answer a call from an extension telephone 16 and 21. It is well understood that there are several optional embodiments of these functions, such as integrating the functionality of the PC circuit 10 into the PC 13 without departing from the spirit and intention of the invention.

The preferred organization of the invention allows easy installation of the system by installing the SOHO PBX Adapter Unit or Units on each telephone in the house or office, and installing the PC 10 circuit and software to the users PC. No household or office telephone premise internal wiring changes are necessary to install the inventive system, and no special equipment is needed on the called telephone 7.

In operation of the invention, the internet user establishes connection to the internet by causing his PC 13 to dial the telephone number to the ISP POP 2, thereby establishing a modem link with the appropriate protocol. During this "internet browsing session", the internet user's external telephone line 8 is not available to receive another call via traditional telephony methods.

To initialize the invention, the following steps occur:
 (a) The Internet user commands his PC 13 to establish a dial-up connection with ISP POP 2, at which time the PC 13 seizes the external telephone line 8 occupying it and blocking it from inbound calls from the caller's telephone 7,
 (b) upon connection and establishment of the connection to the ISP POP 2, the PC software 18 queries the ISP POP 2 for the internet protocol (IP) address which has been dynamically assigned to this session,
 (c) the PC software 18 then transmits the current session IP address value and the local telephone number of the Internet user to the Internet Voice Gateway 3, which stores it in temporary memory for the duration of the session associated with the telephone number of telephone line 8, and
 (d) the PSTN 6 forwards all calls destined to the telephone line 8 to the Internet Voice Gateway 3 via telephone line 4 with identification information of the destination telephone number (line 8) using a common protocol such as Dialed Number Identification Service (DNIS).

When the caller at telephone 7 dials the telephone number of the Internet user on telephone line 8, the following steps occur:
 (a) the PSTN 6 forwards the call to the IP Voice Gateway 3 with the telephone number information pertaining to line 8,
 (b) the Internet Voice Gateway 3 references its temporary memory to determine the current IP address of the Internet user based on his telephone number,
 (c) the Internet Voice Gateway 3 sends an IP message to the ISP POP 2 addressed to the Internet user via the Internet 1, and the ISP POP 2 delivers the message to the PC software 18 via the established modem connection,
 (d) the PC software 18 commands the PC circuit 10 to initiate a call to all of the SOHO PBX extension telephones 16 and 21,
 (e) the PC circuit 10 sends an "all ring" command to all the SOHO PBX telephones using a control message on an FM channel received by all SOHO PBX Adapter Units 14 and 20, and
 (f) SOHO PBX adapter units 14 and 20 receive the "all ring" control message and generate ring signals to the telephones 16 and 21 causing them to audibly ring.

If someone in the small office or residence lifts the handset of one or more of the extension telephones, the following steps occur (otherwise the telephones ring until the caller 7 aborts the call):
 (a) the SOHO PBX Adapter Unit 14 or 20 detects the off-hook condition of the telephone 16 or 21 and sends an "answered" control message to PC circuit 10 via an FM channel,
 (b) the PC circuit 10 receives the "answered" control message and passes it to the PC software 18 via the RS-232 connection of 12,
 (c) the PC software 18 notifies the Internet Telephony software, also part of 18, that the call should proceed,
 (d) a connection is established with audio from the caller's telephone 7 being converted to Internet audio such as GSM or G.723.1 at the Internet Voice Gateway, being sent via the Internet connection to the PC software 18 (via Internet 1, ISP POP 2, PSTN 6, and modem 9), transmitted to the PC circuit 10 via the speaker output of PC 12, modulated to an FM channel by PC circuit 10, received by a SOHO PBX Adapter Unit an Adapter Unit 14 or 20, and converted back into standard telephony signal to telephone 16 or 21 via the emulated POTS interface 15 or 19, and
 (e) a connection is established between the telephone 16 or 21 and the caller's telephone 7 with audio from telephone 16 or 21 being modulated to an FM channel by a SOHO PBX Adapter Unit 14 or 20, the modulated audio being received by PC circuit 10 and being converted to microphone-level signals and presented to the microphone input (MIC) of the PC 13, and the microphone-level signals being digitized according to an Internet Audio standard such as GSM or G.732.1 and sent to the Internet Voice Gateway 3 by the Internet Telephony software 18, and finally this audio is presented by the Internet Voice Gateway 3 to the PSTN and ultimately to the caller's telephone 7, thereby establishing a full-duplex audio connection between telephone 7 and 16 or 21 while allowing Internet browsing at PC 13 to continue.

When either party hangs up, control messages are exchanged between the Internet Voice Gateway and the PC software 18 which causes the connection to be terminated and returned to an idle state.

To make an outbound call from one of the SOHO PBX extension telephones 16 or 21 while Internet browsing is in progress at PC 13, the following steps occur (the above initialization sequence has already been accomplished):

(a) a user lifts the handset of a SOHO PBX extension telephone 16 or 21, (b) a SOHO PBX Adapter Unit 14 or 20 detects the off-hook condition by the flow of loop current at the emulated POTS interface 15 or 19, (c) the SOHO PBX Adapter Unit issues dial tone to the telephone signaling the user to dial a number, (d) the SOHO PBX Adapter Unit receives and decodes the dual-tone multifrequency (DTMF) digits dialed by the user, (e) the SOHO PBX Adapter Unit sends an "initiate call" control message containing the dialed digits to the PC circuit 10 via an FM channel on the telephone wires 8', (f) the PC circuit 10 receives the "initiate call" control message and transfers the dialed digits to the PC software 18 via the RS-232 connection 12, (g) the PC software 18 initiates a new call sequence with the Internet Telephony software, also part of 18, to the number dialed, which causes messages to be sent to the Internet Voice Gateway 3 to initiate a call via the on-going Internet modem connection, (h) the Internet Voice Gateway 3 seizes an outbound telephone line 4 to the PSTN and dials the digits to address telephone 7, (i) the PSTN 6 "rings" telephone 7.

If someone answers telephone 7, the following steps occur (otherwise telephone 7 rings until the SOHO PBX user aborts the call attempt):

(a) the PSTN 6 detects the "answered" state of telephone 7 and establishes a full duplex connection between the Internet Voice Gateway 3 and telephone 7, (b) a full duplex connection between the Internet Voice Gateway and the SOHO PBX extension telephone is established in the same manner as described in the above "inbound" case, thereby completing a full duplex connection between the telephone 7 and the SOHO PBX extension telephone 16 or 21 while allowing Internet browsing at PC 13 to continue simultaneously uninterrupted and undisturbed.

Although the present invention has been described in detail including its advantages and preferred embodiments, it should be understood that various combinations of the features, and alternate implementations of the components can be made to the invention without departing from the spirit and scope of the invention. Some of the most obvious alternate embodiments of this invention would include:

(a) implementation of the PC circuit 10 functionality as a plug-in card for PC 13, (b) implementation of the PC 13 functionality integral to PC circuit 10 as a stand-alone unit (a so-called Internet appliance) to allow the SOHO PBX to have Internet Telephony capability without the need for an actual personal computer, (c) integration of the telephones 16 and 21 with the special control software 18, modem functionality 9, and PC circuit card functionality 10 to create an Internet telephone which does not require a discrete SOHO PBX or personal computer.

What is claimed is:

1. A method for allowing a small-office/home-office (SOHO) private branch exchange (PBX) to receive an inbound telephone call and an active Internet client to simultaneously use a single telephone line, comprising the steps of:

an Internet user commanding his personal computer (PC) to establish a dial-up connection with an Internet Service Provider Point-of-Presence (ISP POP), at which time said PC seizes a first telephone line of the Public Switched Telephone Network (PSTN), thus occupying said telephone line and blocking it from inbound calls, said PC being equipped with multimedia means, Internet browsing and communication means, Internet Telephony means, and line-sharing SOHO PBX control and communications means;

said PC thereby establishing a communications path to an Internet via said ISP POP;

said PC Internet communications means receiving an Internet address from said ISP POP;

said PC communicating to an Internet Voice Gateway said Internet address via said Internet communications path, said Internet Voice Gateway being communicably connected to said Internet and a second telephone line of said PSTN, said Internet Voice Gateway having capability to transcode Internet audio messages to PSTN audio and PSTN audio to Internet audio message, said received Internet address being stored in a local memory associated with telephone number of said first telephone line to the PSTN;

said PSTN then forwarding all calls originally destined for said first telephone line to the Internet Voice Gateway via said second telephone line, said transfer of call being accompanied by information indicating the original destination telephone number of said first telephone line;

said Internet Voice Gateway retrieving said Internet address from memory associated with the telephone number of said first telephone line;

said Internet Voice Gateway sending a line-ringing control message to said PC software using the Internet address retrieved from memory when a transferred call is received which was originally destined for said first telephone line;

said PC Internet communications means receiving said line-ringing control message and generating in response to receipt thereof a ring-all-phones control message to a line-sharing SOHO PBX via said SOHO PBX control and communications means, thereby causing a plurality of extension telephones of a SOHO PBX to ring;

said PC Internet communications means receiving an extension-answered control message from said SOHO PBX via said SOHO PBX control and communications means;

said PC communicating full-duplex audio via said PC multimedia means to a line-sharing SOHO PBX modulation interface device, said modulation interface device being capable of full-duplex audio communications with the SOHO PBX extension telephones over said first telephone line; and establishing a full-duplex audio communications path between said second telephone line from the PSTN at the Internet Voice Gateway and a SOHO PBX telephone.

2. The method of claim 1 wherein the information of the telephone number originally dialed is delivered to the Internet Voice Gateway using a Dialed Number Information Service (DNIS) protocol.

3. The method of claim 1 wherein the transcoding of voice signals by the Internet Voice Gateway uses the International Telecommunications Union recommendation G.723.1 vocoding technique for the Internet audio.

4. The method of claim 1 wherein the SOHO PBX control and communications means is a channelized frequency modulation technique.

5. The method of claim 1 wherein the method of establishing communications between the PC and the ISP POP is Printer Access Protocol (PAP).

6. A system for allowing a line-sharing small-office/home-office (SOHO) private branch exchange (PBX) to receive an inbound telephone call while an active Internet client simultaneously uses a shared telephone line, comprising:

a personal computer (PC), said PC being equipped with multimedia means, Internet browsing and communication means, Internet Telephony means, and line-sharing SOHO PBX control and communications means, said Internet browsing means having an electrical connection to a first telephone line of a Public Switched Telephone Network (PSTN), said SOHO PBX control and communications means sharing said electrical connection to said first telephone line;

an established a data communications session with an Internet Service Provider Point-of-Presence (ISP POP), occupying said first telephone line and blocking it from receiving traditional inbound calls, an Internet Voice Gateway, said gateway also being equipped with Internet communications means, and further equipped with Internet Telephony to standard telephony transcoding means and an electrical connection to a second telephone line of said PSTN;

a means disposed within said PSTN for transferring all calls originally destined to said first telephone line at said PC to said second telephone line at the Internet Voice Gateway, said transfer of call including a means for indicating the identity of said first telephone line; and a coordination and control means disposed in said PC which allows said SOHO PBX communications and control means and said PC Internet Telephony means to interoperate such that the established Internet session is utilized for continued browsing for handling of inbound telephone traffic simultaneously.

7. The system of claim 6 wherein means for communicating the identity of the originally dialed first telephone line is a Dialed Number Information Service (DNIS) protocol.

8. The system of claim 6 wherein the transcoding means of voice signals by the Internet Voice Gateway uses the International Telecommunications Union recommendation (ITU) G.723 vocoding technique for the Internet audio.

9. The system of claim 6 wherein the SOHO PBX control and communications means is a channelized frequency modulation technique.

10. The system of claim 6 wherein said SOHO PBX control and communications means further comprises:

a SOHO PBX terminal emulation device, said terminal emulation device having a bidirectional connection to said first telephone line, a microphone-level output, a speaker-level input, and a bidirectional RS-232 serial data control interface, said terminal emulation device providing audio translation between modulated channels of said SOHO PBX and said speaker input and microphone output;

a software control component installed in said PC for coordinating functions of the SOHO PBX and the Internet Telephony means, said software control component receiving and sending SOHO PBX control messages via said a serial port on said PC connected to said bidirectional data control interface of the SOHO PBX terminal emulation device; and a voice data communication means within said PC which routes audio data between said Internet Telephony means and multimedia speaker output and microphone inputs of said PC multimedia means, said multimedia speaker output being electrically connected to said terminal emulation speaker-level input, and said multimedia microphone input being electrically connected to said terminal emulation microphone-level output, thereby providing an audio path between said SOHO PBX and said Internet Telephony means.

11. A method for allowing a small-office/home-office (SOHO) private branch exchange (PBX) to make an outbound telephone call and an active Internet client to simultaneously use a single telephone line, comprising the steps of:

an Internet user commanding his personal computer (PC) to establish a dial-up connection with an Internet Service Provider Point-of-Presence (ISP POP), at which time said PC seizes a first telephone line of the Public Switched Telephone Network (PSTN), thus occupying said telephone line and blocking it from making outbound calls, said PC being equipped with multimedia means, internet browsing and communication means, Internet Telephony means, and line-sharing SOHO PBX control and communications means sharing said first telephone line;

said PC thereby establishing a communications path to an Internet via said ISP POP;

said SOHO PBX control and communications means receiving an initiate-outbound-call control message from a line-sharing SOHO PBX via said first telephone line, said initiate-outbound-call control message containing a telephone number to which connection is desired;

said SOHO PBX control means commanding said Internet Telephony means to initiate an Internet Telephone call, thus causing an Internet Voice Gateway to seize a second telephone line to the PSTN and dialing the indicated telephone number from the initiate-outbound-call control message, said Internet Voice Gateway being communicably connected to said Internet and the second telephone line of said PSTN, said Internet Voice Gateway having capability to transcode Internet audio to PSTN audio and PSTN audio to Internet audio; and said SOHO PBX control and communication means establishing a full-duplex audio connection between said Internet Telephone call and said SOHO PBX, thereby establishing a full-duplex end-to-end audio path between an extension telephone of said SOHO PBX and a telephone connected to said PSTN via the Internet Voice Gateway.

12. The method of claim 11 wherein said Internet Telephony means and said Internet Voice Gateway employ ITU Recommendation G.723 internet voice encoding and decoding schemes.

13. The method of claim 11 wherein communication between said SOHO PBX control and communications means and a SOHO PBX uses a channelized frequency modulation scheme.

14. The method of claim 11 wherein the method of establishing communications between the PC and the ISP POP is Printer Access Protocol (PAP).

15. A system for allowing a line-sharing small-office/home-office (SOHO) private branch exchange (PBX) to make an outbound telephone call and an active Internet client to simultaneously use a single telephone line, comprising:

a personal computer (PC), said PC being equipped with multimedia means, Internet browsing and communication means, Internet Telephony means, and line-sharing SOHO PBX control and communications means for interfacing to a SOHO PBX via a first telephone line;

an established dial-up connection with an Internet Service Provider Point-of-Presence (ISP POP) with said PC via said first telephone line to a Public Switched Telephone Network (PSTN), thus occupying said first telephone line and blocking it from inbound and outbound calls, said ISP POP and established dial-up connection enabling said Internet browsing and communications means to access an Internet;

an Internet Voice Gateway, said Internet Voice Gateway being communicably connected to said Internet and a second telephone line of said PSTN, said Internet Voice Gateway having capability to transcode Internet audio messages to PSTN audio and PSTN audio to Internet audio message;

a SOHO PBX initiate-outbound-call control message from a line-sharing SOHO PBX to said PC SOHO PBX control and communications means, said initiate-outbound-call control message containing a telephone number to which connection is desired;

a SOHO PBX command to said Internet Telephony means to initiate an Internet Telephone call, which causes the Internet Voice Gateway to seize said second telephone line to the PSTN and dialing the indicated telephone number from the initiate-outbound-call control message; and a further capability of said SOHO PBX control and communication means to establish a full-duplex audio connection between said Internet Telephone call and said SOHO PBX, thereby establishing a full-duplex end-to-end audio path between an extension telephone of said SOHO PBX and a telephone connected to said PSTN via the Internet Voice Gateway.

16. The system of claim 15 wherein said Internet Telephony means and said Internet Voice Gateway employ ITU Recommendation G.723 internet voice encoding and decoding schemes.

17. The system of claim 15 wherein communication between said SOHO PBX control and communications means and a SOHO PBX uses a channelized frequency modulation scheme.

18. The system of claim 15 wherein the method of establishing communications between the PC and the ISP POP is Printer Access Protocol (PAP).

* * * * *